May 14, 1940.                B. H. McQUEER                2,200,930
              PROCESS OF AND APPARATUS FOR HEATING MATERIALS
                      Filed May 15, 1937        2 Sheets-Sheet 1

INVENTOR
BERT HARRISON McQUEER
BY
Roy F. Steward
ATTORNEY

Patented May 14, 1940

2,200,930

UNITED STATES PATENT OFFICE 2,200,930

PROCESS OF AND APPARATUS FOR
HEATING MATERIALS

Bert Harrison McQueer, St. Marys, Pa., assignor to
Speer Carbon Company, St. Marys, Pa., a corporation of Pennsylvania Application May 15, 1937, Serial No. 142,935

14 Claims.  (Cl. 126—343.5)

This invention relates to processes of and apparatus for heating materials; and it relates more particularly to the art of heating to a desired degree of fluidity materials which are initially in a viscous or solid state and which require to be heated through a considerable temperature range in which they are very viscous, in order to render them sufficiently fluid.

It has been the practice in the past simply to deposit materials of the nature referred to into a melting pot or other heating vessel in bulk and to apply the necessary heat to the materials through the wall of the vessel for a sufficient length of time to cause the mass of material to be heated to a substantially uniform temperature at which the desired degree of fluidity is obtained.

For various reasons, such a method of heating is necessarily slow, and it is also open to other serious objections. For one thing, little if any convection can be induced by gravity in viscous material so that there is little or no helpful circulation to promote effective heat transfer. Moreover, the film of material in contact with the heated surface of the melting pot tends to adhere to the surface and thereby to interfere with the direct and efficient transmission of heat into the main body of the material. The film, itself, is a poor conductor of heat, and it limits the approach of the colder portions of the material to the vessel wall. There is a strong tendency therefore to oppose the transmission of heat into the material and to localize such heat as is transmitted in the material nearest the heat source and cause such material to become damaged by excessive heating. This is particularly true because the slow rate of distribution of the heat throughout the material offers a strong inducement to speed up the operation by heating the melting pot to a temperature which the material cannot safely withstand.

It is a primary object of the present invention to overcome the difficulties referred to above by providing a novel and efficient method for rapidly heating viscous material to a desired degree of fluidity, the method being applicable both to materials which are initially or normally in a viscous state and to materials which are initially or normally in a solid state but which become viscous upon melting.

It is a further object of the invention to provide a continuous process of the nature referred to above, i. e. a process in which the quantity of material undergoing heating at any one time may be relatively small, but cold material is continually added to the mass being heated while hot material of the desired fluidity is continually being withdrawn from said mass.

It is a further object of the invention to provide a novel heating apparatus for facilitating the effective and efficient carrying out of the novel process.

With the above objects in view the process constituting the present invention comprises acting on a mass of the material to be heated so as to set it in rotation within a surrounding and confining stationary heated surface, at such a velocity that the material will be maintained in the form of a hollow shell.

Important advantages effects result from this treatment. The centrifugal force acting upon the material tends to force the colder, heavier portions outward toward the surrounding heating surface and thus to induce a far more forceful convection than would be induced by gravity. The rotating mass, moreover, tends to rub away the heated material adhering to the stationary heating surface and thus to permit closer approach of the colder material to the heating surface.

It has been found in actual practice that the heating of the material can be very greatly expedited by the procedure referred to, even though the heating surface be maintained but little above the final temperature to which the material is to be heated. But it has also been found that, where desired, the heating surface in contact with the material may be safely maintained at a much higher temperature than would be feasible for material containing volatile constituents when employing the melting pot method, since, by speeding up the transmission of heat to the colder portions of the material, localized overheating of the hotter portions is avoided.

The method is desirably made continuous by feeding cold material to one end of the rotating mass and withdrawing hot fluid material from the opposite end. Thus the material may be heated as it is required for use without the necessity of holding any substantial quantity of it in a fluid state for any great length of time.

The apparatus constituting part of the invention comprises a stationary heating vessel, in the form of a cylindrical shell, ordinarily substantially circular in cross-section, a rotary impeller disposed within the shell in co-axial relation thereto, and mechanism for driving the impeller in such manner as to insure maintaining the material mass at all times in rotation so as to form a hollow cylindrical body which presses against the interior surface of the said cylindrical shell, said heating apparatus also being provided with means for feeding to the interior of said hollow cylindrical body, at one end thereof, fresh material to be heated, and with means, acting at the opposite end of said hollow cylindrical body for removing and carrying off the sufficiently heated and therefore fluid material from the rotating hollow cylindrical mass of material.

It is a further feature of the invention, in a particular advantageous embodiment thereof, that provision is made for automatically interrupting the feeding of material, or for automatically reducing the rate of feeding of the material to the rotating mass, or for automatically increasing the heating surface temperature, whenever the driving load of the impeller increases to a value which tends to objectionably retard the rotation.

Other objects and advantages will hereinafter appear.

The invention will now be more particularly described in connection with the accompanying drawings and then pointed out in the claims.

Figure 1:
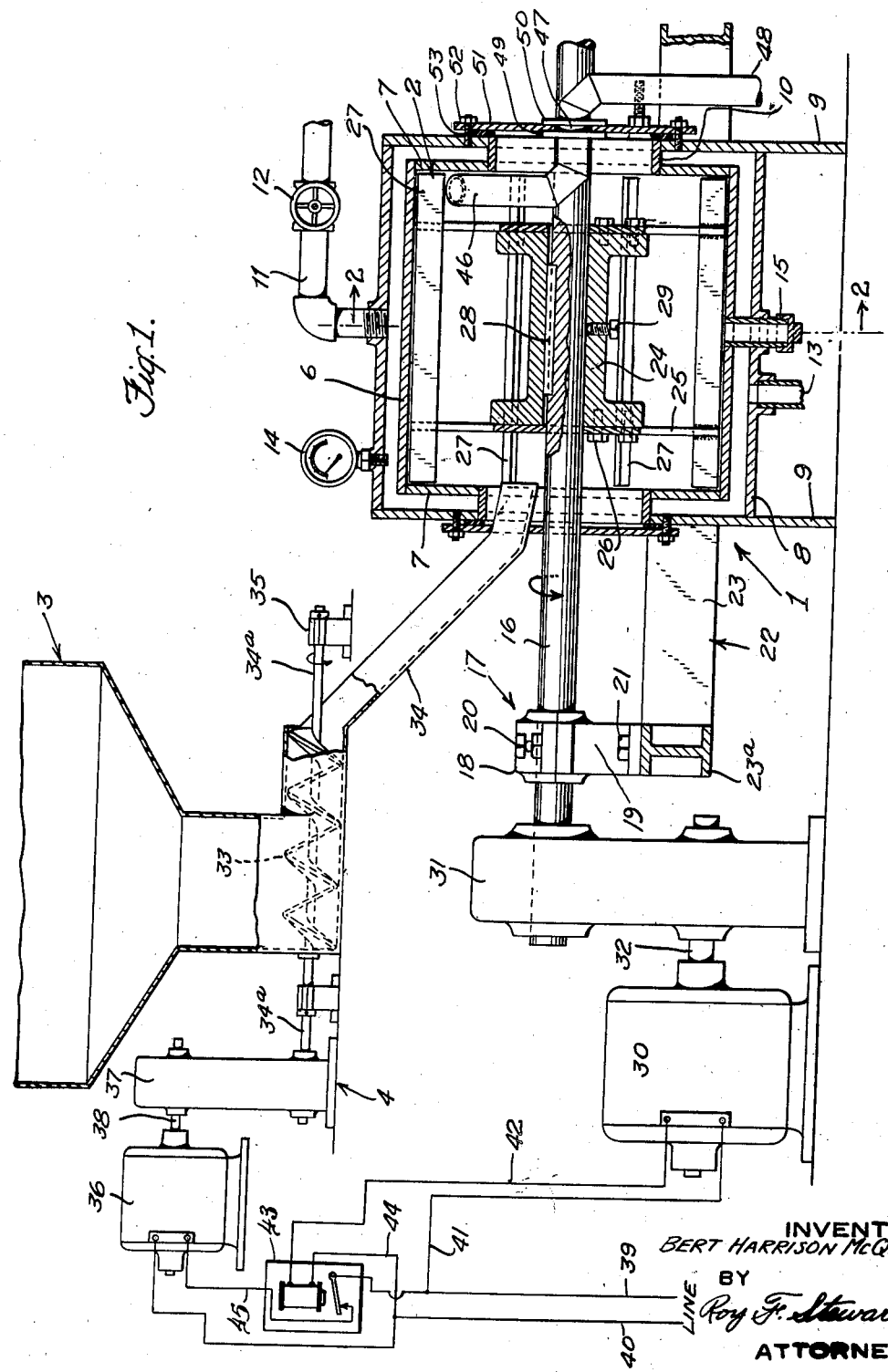
Fig. 1 is a longitudinal sectional view, partly in elevation and partly diagrammatic, of an apparatus for carrying out the process.

While the invention is applicable broadly to heat-treating a wide variety of materials for the purpose of giving them a desired degree of fluidity, including for example such materials as glue, heavy fuel oil, etc., its application to the melting of coal tar pitch will be described for illustrative purposes, since this application of the invention is a particularly important one from a practical point of view and serves well to illustrate the problems involved and the solution achieved by means of the invention.

Pitch is a very difficult material to heat to fluidity. Heat transference must, of course, occur either through radiation, conduction or convection. Pitch immediately absorbs radiant heat at the surface, but it has a low coefficient of thermal conductivity and is so viscous at melting temperature that gravity is substantially ineffective to induce convection. The heating of a stationary mass of pitch in an ordinary melting pot, therefore, is extremely slow because the heat tends to remain localized in the immediate vicinity of the heat source.

A coal tar pitch which melts at 210° F. is freely fluid at 400° F. and is rarely, if ever, required to be used at a much higher temperature; yet, to provide a supply of melted pitch of proper fluidity for use as a binder in molding operations, as, for example, in the manufacture of molded carbon products, presents a practical problem not satisfactorily solved heretofore. A 210° F. melting point pitch cannot be easily pumped at temperatures much below 250° F. It is evident, therefore, that in heating such pitch from atmospheric temperature to 400° F., about one-half of the heat must be transferred to the pitch while the pitch is in a solid or plastic form in which forced convection heating cannot be employed in apparatus hitherto available.

If the pitch is heated in one solid mass or in large lumps, conduction alone must be depended upon for penetration of the heat to the interior of the solid mass or of the lumps.

If it is attempted to increase the amount of surface of the pitch by crushing or pulverizing before heating, one of two undesirable situations is usually encountered. Either the crushed pitch sinks to the bottom of the heater and forms into a loosely packed lump to which heat must be transferred by conduction through contact with the surrounding molten pitch, or the pitch particles or fragments deposited on the surface of the liquid tend to cohere into a spongy lump with sufficient air entrapped to cause the lump to float as a spongy island in heated liquid. In either case, the rate of heat transfer to the solid pitch is very slow.

Because of the low film coefficients of heat transfer at the heating surface and at the lump surface, either or both of two expedients have usually been resorted to: (1) a very large melting surface has been provided, or (2) very high temperatures have been used.

In either case there has been a serious handicap because of the fact that the pitch carries a certain amount of insoluble material, generally described as residue or free carbon. If the heat transfer is accomplished by increasing the melting surface, the surface must be kept simple, to allow for periodic cleaning and removal of residue which settles out. A simple type of surface always results in some form of container having a volume of melted pitch which is large in comparison to the output of the apparatus. The high ratio of volume to output makes it necessary that the pitch be held at a fairly high temperature for a long time. Under these conditions there is a slow and continual loss of volatile oils from the pitch, which raises the melting point, and changes the composition of the product. The pitch fumes are a skin irritant, and present a fire hazard.

In most cases where it is necessary to provide a supply of molten pitch, the demand for pitch is not constant. But either the tank of pitch must be maintained in melted condition at all times, even though pitch is not then being withdrawn for use; or, if the temperature is allowed to drop during a substantial suspension of operations, as, for example, over night, the tank must be fired hard before starting up again in order to have the pitch at the proper temperature when operations start. In either case there is, under prior practice, a continual change or swing in the composition of the pitch from one time to another, and this changes the fluidity of the heated pitch and therefore tends to prevent obtaining products of uniform and predetermined characteristics in process using the pitch, such, for example, as processes involving use of the pitch as a binder in the molding of carbon brushes, bearings, etc.

On the other hand, if the amount of heating surface in the melter is kept low, then, in order to retain simple surfaces and a low ratio of melter volume to output, it is necessary to resort to higher temperatures in the melt. This again causes an increase in the rate at which volatile constituents are lost; but since the output is rapid, the oil loss is practically constant and stability of flow conditions can be maintained. But when such higher temperatures are used, the residue or free carbon which settles out of the pitch adheres tenaciously to the heated surfaces and further insulates them from the melt. This layer of adhering residue occludes some of the melt, which is quickly coked and bonds the residue to the heated surfaces. If operation is continuous, this growth of an adherent, hard, semiporous insulating shell calls for continually increasing the true heating surface temperature until the temperature limit of the metal is reached. In case of a shut-down period, shrinkage of the heating surface around the hard shell may sometimes crack the heating surface. But if the coke layer is not sufficiently hard and tough to cause such cracking, then the coke will be spalled off during temperature changes and be carried into the pitch stream, causing a loss of finished stock because of pitch spots. This loss from scale inclusion is a serious factor in the manufacture of some products.

The present invention eliminates these difficulties by securing a mechanically induced circulation of the pitch during heating, whereby the solid as well as the more viscous portions of the pitch are forced against the heat-supplying surface or wall, displacing the hotter, more fluid pitch which, thereby, is prevented from remaining entrapped or imprisoned adjacent such surface or wall.

Such circulation is induced by rotating the pitch within a surrounding and confining stationary heating surface, at sufficient velocity to maintain the pitch in the form of a hollow shell which presses outward against the heating surface. Most desirably the shell of rotating material is maintained in the form of a hollow cylinder having its axis horizontally disposed. This treatment of the material is desirably brought about by heating it in a horizontally disposed, steam-jacketed vessel or tube having a cylindrical inner wall, and rotating the material by means of a rotary impeller disposed within the vessel and in co-axial relation thereto.

Like most other materials, pitch is more dense when solid or highly viscous, than when freely fluid or liquid; and it may be laid down as a general proposition that the density varies in inverse relation to the temperature. In the heating of a stationary fluid body of pitch this variation of density has some tendency to induce convection currents but, because of the material being at temperatures only slightly above the melting point, any tendency toward convection is so slow that a relatively very low temperature source must be employed to avoid volatilization and coking.

In accordance with the present invention, however, rotation of the pitch body in the manner above stated produces a number of advantageous conditions. The centrifugal force is greater than the force of gravity, and is sufficient to cause the heaviest part of the pitch, which is in solid lumps, to be forced outward through the sticky mass and against the heated vessel wall. This, in itself, tends to displace the lighter and more fluid pitch away from the wall. Since the mass of pitch is rotating relative to the vessel wall, moreover, the more solid or denser portion of the pitch exerts a rubbing action against the wall which tends to displace the pitch of greater fluidity. The rubbing action also prevents lodgement upon the vessel wall of any residue or free carbon originally present in the pitch.

In the case of viscous pitch films, a small amount of the lighter constituents may in some cases be vaporized without boiling the mass of the film, so that very small, perhaps microscopic, bubbles of gas may be formed in the stationary or slow-moving film, with considerable heat-insulating effect. Cutting down the thickness of such a film by even a small amount should, therefore, improve the efficiency of heat transfer. Both the rubbing action and the effect of centrifugal force contribute to achieving this desirable result.

Whatever may be the true explanation for the effectiveness of the method herein described, it does greatly expedite the transference of heat into and throughout the pitch body, as compared with prior practice, and thereby makes it possible to melt pitch rapidly without overheating it, in an economical and efficient manner.

The pitch is desirably fed into the vessel at one end and withdrawn from the other. The inner surface of the vessel wall at the introductory end will necessarily be somewhat cooler than the corresponding surface at the delivery end, therefore, even though the heat is applied uniformly from end to end of the vessel. The pitch which is forced into engagement with the wall at the introductory end, and the movement of which away from the wall is most impeded by the extreme viscosity of the pitch which overlies it, will nevertheless find an opportunity to escape from immediate contact with the wall, when sufficiently heated, by traveling lengthwise of the vessel toward the delivery end. Somewhere between the introductory and delivery ends a zone will be reached where the mass of pitch is sufficiently fluid throughout its entire depth to permit a normal convection to occur. This action will be accelerated by the centrifugal force which is acting throughout the pitch body, so that at the delivery end the pitch most remote from the heating surrounding wall of the vessel will be at a suitable delivery temperature and at or near the maximum temperature attained at any point in the rotating mass.

From what has been said concerning the principles of operation of the invention, it will be apparent that provision is made for preventing any portion of the pitch which tends to approach a volatilizing or coking temperature remaining dangerously long in contact with the tube wall. This being the case, it is possible without incurring the risk of volatilizing and coking to employ a much higher heat-source temperature than would be feasible if the pitch were merely permitted to lie dormant (subject to gravity convection) in a stationary vessel. The temperature gradient between the vessel wall and the contiguous pitch may be much steeper than could safely be attempted with a stationary pitch body; both because the source temperature may be higher and because the coolest part of the pitch is continually being forced against the vessel wall to displace hotter portions. This increased temperature gradient, of course, conduces greatly to the rapid transference of heat from the vessel to the pitch mass.

It is to be noted that the rotary impeller employed in carrying out the invention has for its essential function to bring about and maintain the rotation of the mass of material which is to be heated, and at such an angular velocity that a hollow cylindrical mass will be formed, which mass will rotate in contact with a tubular heating surface. Hence, the impeller does not run in contact with the inner wall of the tubular heating surface, and hence does not serve as a scraper. Nor is the impeller intended to serve primarily as a stirrer, mixer or cutter, although some slight action in stirring, mixing or breaking larger lumps of pitch may occur incidentally. Because of the speed of rotation of the impeller, not only is the mass of material rotated in contact with the heating surface, but it is rotated with such a velocity that a centrifugal force of substantial amount is developed so that solid portions, or more viscous portions are forced outward and into strong contact with the heating surface.

The energy required to drive the impeller is not excessive, for the reason that in the practice of the invention, the film of pitch in immediate contact with the major portion of the vessel wall is always maintained quite fluid. This last condition will be attained, however, only if there is a proper balance of three factors; namely, temperature of the heat source, impeller speed, and rate of feed of the cold material to the revolving mass of material. If the impeller speed is too high in relation to the other factors, the lumps of solid material may be pressed against the heating surface with sufficient pressure to cause the temperature of the immediate heating surface to be substantially lowered. The intermediate film, upon which the lump normally slides, then becomes viscous or freezes. Freezing, if actually permitted to occur, would be apt to result in breakage of the apparatus. Any increase above normal of the viscosity of the film of material in contact with the vessel wall increases the driving load, impairs the operating efficiency and, in aggravated instances, prevents rotation of the impeller at sufficient speed to maintain the cylindrical form of the material mass. Control of the temperature (viscosity) of the film in contact with the vessel wall is therefore of prime importance. Theoretically, any two of the three controlling factors, rate of feed, rate of rotation and source temperature, could be fixed, and control could be effected by varying the third. Practically, however, the greatest flexibility and the most sensitive responsiveness to unintended variations, are secured by varying the rate of drive of the impeller. The most efficient, safe, and practical operation is secured by varying the rate of drive of the impeller and one or the other of the two remaining factors.

By providing a constant source of power and transmitting the power through a yieldable drive, certain mutually compensating factors may be caused to come into play, which operate against "freezing" under adverse conditions and at the same time tend to limit the force required to maintain rotation at a sufficiently rapid rate to cause the cylindrical form of the pitch mass to be maintained.

If, for example, the pitch is supplied at an irregular and widely varying rate and the available heat supply is held uniform, the frictional load will vary considerably. For the purpose of analyzing this condition, a rather extreme variation of supply will be considered. If it be supposed that there has been a lapse in the supply of solid pitch so that the material in the cylindrical vessel or tube is nearly all at or near the final desired fluid temperature, the frictional resistance will be relatively low and the rate of rotation will be relatively rapid, that is, considerably more rapid than the minimum rate required to maintain the mass in the form of a hollow cylinder. Under these conditions the value of the centrifugal force is high and the viscosity of the material is relatively low, both factors tending to promote rapid convection. There will still be no danger of coking or volatilization, therefore, because no portion of the pitch will be permitted to remain in contact with the vessel long enough to permit it to be heated substantially above the temperature of the revolving mass.

If now a considerable mass of solid pitch is added to the introductory end of the vessel, a portion of it will promptly force its way outward to the vessel wall and will tend to spread along the surface of the vessel. The frictional resistance will be increased as the fresh (colder) pitch spreads, but since the building up of the frictional resistance correspondingly retards the rotation, the centrifugal force will be correspondingly reduced.

Since the driving load is directly dependent upon the force with which the rotating mass as a whole presses outwardly against the vessel wall, a reduction of the centrifugal force will tend to reduce the driving load and thus to avoid further loss of speed. Other safeguarding factors also come into play with loss of speed and the consequent reduction of the centrifugal force.

The centrifugal force is a factor of prime importance in causing the solid or more viscous material fed in at the introductory end of the vessel to press and to travel outwardly to the vessel wall and then to spread along the wall. It is evident, therefore, that this pressing and spreading action will be rendered less forcible as a result of diminution of the centrifugal force. The solid and viscous material will therefore be held back at the introductory end of the vessel by reason of the very fact that a loss of speed has occurred.

The holding back of the freshly introduced material will also be promoted by the fact that the loss of speed which has occurred has been brought about by the presence of an increased amount of relatively cold, viscous material adjacent to the vessel wall toward the introductory end. This material is more difficult to displace or penetrate than the hotter, more fluid material would be, because of its viscosity. It is also more difficult to penetrate because, being relatively cool, it is relatively dense, and therefore exerts a greater buoyant effect upon the cold, freshly introduced material than would the hotter material.

A retarded rate of rotation will prevail until the newly introduced pitch has been gradually assimilated and heated sufficiently to enable the denser portion of the pitch to move more freely against the vessel wall and still produce less total friction than the maximum which can be tolerated at the minimum rate of rotation. After that the rate of rotation will again rise, causing the rate of circulation to be increased and the possible duration of contact to be reduced.

In the foregoing discussion, it has been assumed that the temperature of the heat source remains constant and that the rate of material supply is varied irregularly and according to no particular law or rule. If the temperature of the heat source is held constant and the rate of material feeding is also held constant, then the impeller, driven yieldingly but with uniform power, would rotate at a substantially constant rate. The efficiency of the operation and the delivery temperature of the heated material would both depend in that case upon the relation of the constant rate of material supply to the constant source temperature. By readjusting the feed of material to a new constant rate, or by readjusting the heating source to a new constant temperature, proper balance could be established. This kind of arrangement can be used for materials which can be supplied at a substantially uniform rate.

Many materials cannot practically be supplied at an even rate. The supply rates of initially viscous materials, for example, depend upon the temperatures at which they are supplied. Pitch in lump form cannot be practically supplied to the melter at an invariable rate. Incidental fluctuations or variations in the rate of material supply can be accommodated, however, by making either the feeder or a source temperature regulator responsive to variations in the driving load (or rate of rotation) of the impeller. For example, operation of the feeder may be automatically retarded or suspended whenever the driving load exceeds a predetermined value. Alternatively, a steam pressure reducing valve for controlling the steam pressure in the steam jacket may be made responsive to the driving load, or to the rate of rotation of the impeller, by any suitable automatic means such as a centrifugal regulator driven by the impeller shaft. The valve will be gradually opened wider to increase the steam pressure when the driving load increases, and will be gradually shut off to reduce the steam pressure when the driving load diminishes. If the rate of feeding is normally high, but is made automatically responsive to the driving load on the impeller, it is desirable that means be provided for manually adjusting the steam pressure in the jacket. Manual readjustment of the steam pressure will then automatically alter the output of the apparatus within limits, but will not substantially change the delivery temperature of the material. If the steam pressure is made automatically responsive to the driving load on the impeller, it is desirable that means be provided for manually adjusting the normal rate of operation of the feeder. Manual readjustment of the feeder will then automatically alter the output of the apparatus but will not substantially change the delivery temperature of the material.

The delivery temperature of the material is substantially dependent upon the driving load, and hence upon the rate of rotation of the impeller. Automatic readjustment of the rate of material supply, or of the steam pressure, in response to changes of driving load, tends to hold variations of the driving load within rather narrow limits, and hence to promote uniform delivery temperature of the material, and uniform efficiency of operation.

Optimum operating conditions will be different for different materials and for different average rates of output of a given material. When melting 210° melting point coal tar pitch with steam jacket gauge pressure of 150 pounds per square inch, and with a feed rate of 300 pounds of pitch per hours, in a melter 1 foot long and measuring 1 foot in inside diameter, a very desirable condition is found to occur if the impeller speed is held to approximately 1150 R. P. M. At substantially higher speeds there is evidence of considerable waste of power. Freezing may be encountered at this speed if lower source temperatures are used, together with the other factors as stated. It is believed that the best operation is obtained when the minimum impeller speed at the maximum rate of pitch supply is but moderately above that required to cause the pitch to maintain a hollow cylindrical form. Only sufficient power is provided in the drive, therefore, to make suitable allowance for assuring the cylindrical form of the material under such increases of load above normal as are to be expected in practical operation.

In accordance with the present invention in its most desirable form, no radical variation in the average rate of supply of pitch to the apparatus is permitted to occur. The fact that the rate of rotation and the driving load are dependent upon the rate at which pitch is supplied in relation to the heating action of the apparatus, makes it possible to regulate the supplying of fresh pitch to the apparatus in substantial accordance with the conditions required for most efficient operation.

To this end provision is desirably made of means controlled by an operating condition of the heating apparatus for normally supplying pitch at a substantially uniform average rate and for automatically reducing or interrupting the supply whenever operating conditions require. This regulation may be secured either by retarding or stopping the pitch feeder in response to an increase of the driving load above a predetermined value, or (which may amount to the same thing) in response to a loss of velocity of rotation of the impeller below a predetermined value. This feature will be disclosed in greater detail in connection with a description of illustrative apparatus.

In order to carry out the process in an efficient manner, applicant has devised a special apparatus illustrated in the accompanying drawings, and which will now be more specifically described.

The principal parts of the apparatus, in the embodiment here illustrated, comprise a steam-jacketed heating vessel 1, a rotary impeller 2 therein, a supply hopper 3, feeding mechanism 4 for delivering material to the heating vessel 1, and a discharge pipe consisting of three connected parts indicated at 46, 47 and 48 for discharging heated material from the vessel.

The heating vessel 1 with its jacket is made up of tubes and plates suitably secured to one another as by welding. A cylindrical heating chamber is bounded and defined by a tube or sleeve 6 and circular end plates 7, the end plates 7 being provided with central openings. The jacket is formed by a sleeve or tube 8 and end plates 9, the end plates 9 having openings in alinement with the openings in the plates 7 and of the same diameter as the openings in the plates 7. Short sleeves or tubes 10 are fitted into the openings in the plates 7 and 9 and are welded to the plates. Steam is delivered to the jacket through a pipe 11 controlled by a valve whose operating handle is indicated at 12. A steam outlet pipe 13 also communicates with the jacket. A suitable thermometer or pressure gauge 14 may be mounted on the jacket to guide the operator or attendant. A drain nipple 15 communicates with the bottom of the heating chamber and extends downward through the sleeve 8. This nipple is normally plugged during operation of the apparatus but the plug may be removed to drain the heating chamber when the apparatus is to be shut down for a time. The jacket may, of course, be externally heat-insulated in any suitable manner as by enclosing it in an asbestos composition or casing.

The end plates 9 extend downward beyond the cylindrical part of the vessel and form supporting legs for the vessel.

The rotary impeller 2 is mounted upon a driving shaft 16 which extends through the heating chamber in co-axial relation thereto. The driving shaft 16 is journaled in bearings 17, each comprising upper and lower separable sections 18 and 19. The upper section of each bearing is secured to the lower section by means of bolts 20. The lower bearing sections 19 are secured by bolts 21 to a supporting frame 22 composed of longitudinal channel bars 23 and transverse I-beams 23a which are suitably secured together as by welding. The frame 22 is supported from the end plates 9 of the jacket, the channel bars 23 being welded to the plates 9. Additional support for the frame 22 may of course be provided if desired.

The impeller comprises a hub 24 in the form of a sleeve having flanges at its opposite ends, plates 25 forming outwardly extending arms secured by bolts 26 to the hub flanges, and impeller blades 27 at the outer ends of the arms 25. The shaft 16 is keyed to the hub 24 by means of a key 28 so that rotary motion of the shaft is positively transmitted to the impeller. The hub 24 is also held against longitudinal movement relative to the shaft 16 by means of a set screw 29. In a typical instance, the impeller blades may be one inch wide (radially), and there may be a clearance of about one-eighth inch between the outer edge of each blade and the adjacent inner wall of the cylindrical heating chamber; but these figures are to be understood as merely indicative of what has been found to be good practice, and as in no sense restrictive.

Figure 2:
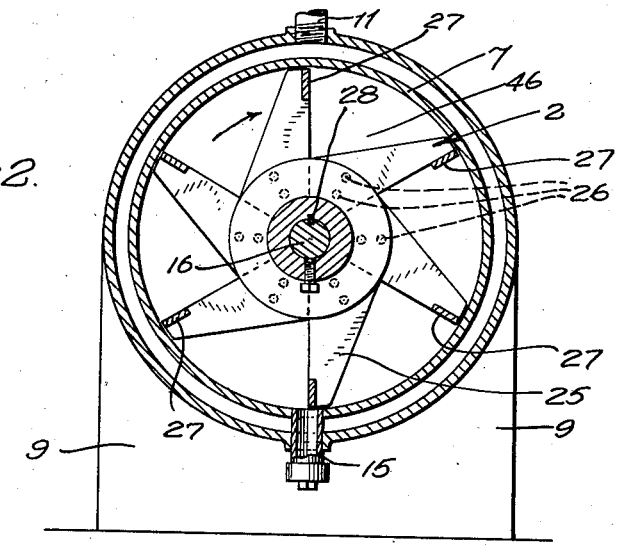
Fig. 2 is a transverse vertical section through the heating mechanism, taken on the line 2—2, Fig. 1, looking in the direction of the arrow.

As best seen in Fig. 2, each arm forming plate 25 is secured to the hub 24 by means of two bolts 26. Each plate has a radially extending forward edge and is angularly recessed at its forward, outer extremity so that the associated impeller blade 27 may be mounted in the recess with its forward face radially disposed. The trailing edge of each plate 25 is inclined inward rather sharply so that a space of substantial area is left between the trailing edge of one plate and the leading edge of the next to permit the material being heated to travel through the apparatus in the direction of the length of the vessel. The arrangement shown in Fig. 2 enables the plates 25 with the impeller blades 27 secured to them to be affixed to the hub 24 after the hub is enclosed in the chamber of the heating vessel 1.

The plates 25 at the introductory end serve as breakers for breaking up lump material fed into the tube.

The impeller shaft 16 is yieldingly driven from an electric motor 30 through gearing (not shown) contained in a gear box 31. The gearing forms a suitable driving connection between the motor shaft 32 and the propeller shaft 16.

The material to be heated is supplied to the heating chamber from the bin or hopper 3. The hopper 3 is narrowed down at its lower end and has a screw type feeder 33 operating through the lower end to push the material to be heated into an open trough or chute 34 which delivers the material by gravity into the intake end of the heating chamber alongside the shaft 16. The screw-type feeder comprises a driving shaft 34a which is journaled in suitable bearings 35, and which is driven by an electric motor 36 through gearing (not shown) contained in a gear box 37. The gearing constitutes a driving train between the motor shaft 38 and the feeder shaft 34a.

The motor 36 normally turns the shaft 34a slowly and at a uniform rate so that the material is pushed at a substantially uniform rate into the gravity chute 34. This normal rate of feeding can be adjusted in any desired manner as by providing a change-speed control for the motor 36 or in connection with the gear box 37.

When the normal rate of feeding proves to be fast in relation to the speed of the impeller and the rate at which the material is heated, it is desirable that the feeder 33 be automatically slowed down or arrested temporarily. Provision is made, in accordance with the present invention, for effecting this mode of operation. This feature is illustratively disclosed as means for temporarily interrupting the supply of operating current to the motor 36. When the material is being fed into the heater more rapidly than the heater can handle it without loss of speed of the impeller, there is a loss of speed of the impeller which, of course, means that there is an increase in the driving load on the motor 30. This alters the flow of current to the motor. The changed current flow is utilized to operate a relay for interrupting the current supply to the motor 36.

This control arrangement is diagrammatically illustrated in Fig. 1. While alternating current is desirably used, the current path may most conveniently be traced out by assuming a momentary condition in which the line lead 39 is positive and the line lead 40 is negative. The current is conducted to the motor 30 through a conductor 41 and passes from the motor through a conductor 42. The conductor 42 runs to a controller 43 and the current passes thence through a conductor 44 back to the negative line conductor 40. The current, in passing from the conductor 42 to the conductor 44 through the controller 43, serves to control a relay for governing the supply of current to the motor 36. Current is supplied to the motor 36 from the line lead 39 through the controller and through a conductor 45, the connection between conductors 39 and 45 being controlled by a switch under the influence of the relay in the controller already referred to. The current returns from the motor 36 directly to the line lead 40.

With the supply of material to the heater discontinued, the impeller load is soon reduced to normal, with the result that the controller again connects the feed motor 36 for operation.

Provision is made for constantly removing the heated material from the heating chamber of the heater 1. To this end use is made of the discharge pipe comprising the parts 46, 47 and 48, the inner part 46 being arranged to skim the heated material from the inner face of the rotating mass of material at the discharge end of the heating chamber. The discharge pipe comprising the three united parts 46, 47 and 48, is adjustably mounted so that the intake end thereof may be shifted outward and inward, toward and away from the periphery of the heating chamber. By this means the depth of the material mass in the chamber may be regulated. This feature enables the rotating shell of material to be maintained at the desired thickness for securing proper operating conditions.

Figure 3:
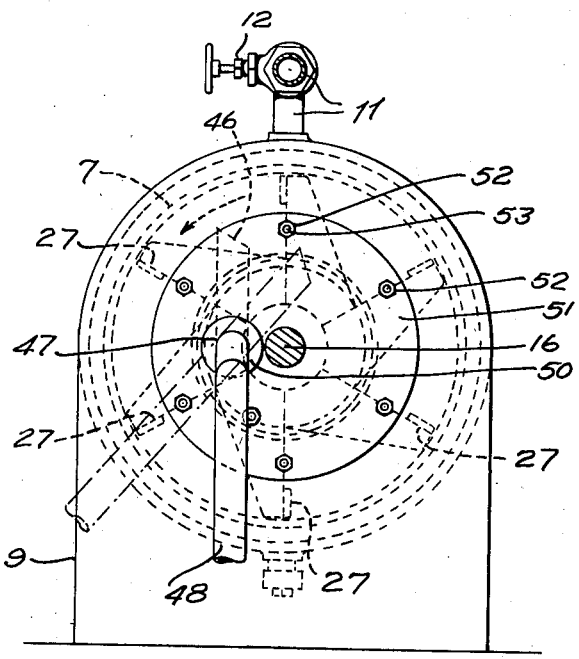
Fig. 3 is an end elevation, partly in section, showing the discharge end of the heater, with parts shown in dotted lines.

It will be noted that the discharge pipe has its downwardly extending section 46 within the heating chamber, an outwardly extending section 47, and an external downwardly extending section 48, these sections being joined together by suitable elbow connections. The section 47 has affixed to it two bearing plates 49 and 50 which bear against opposite sides of an end closure plate 51 at the delivery end of the chamber. The pipe section 47 fits through an opening formed in the closure plate 51 alongside the impeller shaft 16. Since this opening is eccentrically located with reference to the heating chamber, swinging of the discharge pipe about an axis which coincides with the center of the opening serves to swing the intake end of the pipe section 46 toward and from the periphery of the heating chamber. The intake end of the pipe section 46 is desirably beveled (as best seen in Fig. 3) and is so located that it skims the material from the inner surface of the revolving mass at a point near the top of the path of the material. The extreme positions of adjustment of the discharge pipe are illustrated in Fig. 3. In either position, or in any intermediate position, the material is taken from the revolving mass at a point well above the pipe section 47 so that gravity aids the discharge of the material skimmed off.

The end closure plate 51 is removably secured to the end plate 9 at the discharge end of the heater by any suitable means such as bolts 52. The joint between the plates 9 and 51 may be sealed in any suitable manner as by an interposed gasket 53.

Because of the high rate of heat transference, the apparatus may be very small in relation to its output. This is desirable, both because the apparatus can be built economically and because the power required can be kept to a minimum. The fact that the area of surface engagement of the tubular vessel with the material is small is of particular importance in limiting the amount of power required, and this, in turn, enables the entire installation to be of relatively light construction.

The method described for the heating of pitch is essentially followed in heating materials which are initially in a viscous state. An important application of the method to the heating of initially viscous material has to do with the heating of very heavy fuel oil, such as is used for firing oil-burning locomotives. This oil must be heated before it is delivered to the locomotive burner. The oil has a large content of residue or free carbon. As a consequence, it has a troublesome tendency to produce coking in the fuel oil heaters heretofore employed for heating it. The present invention promotes the rapid and economical heating of the oil and obviates coking.

Another important application is the heating of asphalt for highway construction where heaters must be small enough to be practically mounted on road-building machinery.

It is not essential that a mechanical feeder be provided for supplying material to the heater. The heater may be fed manually, but in that case means is provided responsive to variations in the driving load for mechanically controlling the source temperature, this being highly advantageous, both as a means for promoting uniformity of delivery temperature, and as a safeguard against freezing. As such control mechanism is well known to those skilled in the art it is not specifically described or shown.

While I have disclosed, illustratively, desirable forms and applications of the method, and a desirable form of apparatus for practicing the method, it is to be understood that changes may be made in both the method and the apparatus within the scope of the invention. I do not, therefore, desire to limit myself to the specific illustrative examples of the method or the apparatus, but intend to cover my invention broadly in whatever form its principle may be utilized.

What is claimed is:

1. In a method of heating to free fluidity a material having a highly viscous fluid phase at certain temperatures, the step which comprises rotating a mass of such material within and relatively to a cylindrical, surrounding and confining heated surface at sufficient angular velocity to maintain the material in the form of a hollow circular shell in contact with said heated surface.

2. In a method of heating to free fluidity a solid material which when heated will melt and will pass through a highly viscous fluid phase at certain temperatures, the step which comprises rotating a mass of such material about a substantially horizontal axis within and relatively to a cylindrical surrounding and confining heated surface, at sufficient angular velocity to maintain the material in the form of a hollow cylindrical shell in contact with said heated surface.

3. The continuous method of heating to free fluidity a material having a highly viscous fluid phase at certain temperatures, which comprises rotating a mass of such material about a substantially horizontal axis within and relatively to a surrounding and confining heated surface, at sufficient velocity to maintain the material in the form of a hollow shell in contact with the heated surface, progressively adding material to be heated to the hollow shell of material at one end thereof, and progressively withdrawing the heated material from the shell at the opposite end thereof.

4. The method of heating to fluidity a solid material that becomes viscous on melting, which comprises rotating a mass of the said material within and in contact with a tubular heated surface, at sufficient velocity to cause said material to assume substantially the form of a hollow cylinder, and maintaining the velocity of rotation at such speed that the colder, solid and semisolid portions of the material are caused continually to force their way outward through the hotter, less dense portions of the material and into engagement with the heated surface.

5. The method of melting pitch which comprises centrifugally forming and maintaining a hollow cylindrical body of pitch moving in contact with a confining wall and relatively thereto, supplying heat through said wall to the pitch body at a temperature above its melting point, removing melted pitch from said body and adding unmelted pitch thereto.

6. The method of heating solid pitch to fluidity, which comprises introducing pieces of the solid pitch into a tubular vessel heated above the melting point of pitch, and rotating the pitch at sufficient velocity to cause it to assume substantially the form of a hollow cylinder, whereby the pitch in contact with the tubular wall of the vessel is melted, while the colder, solid and semi-solid portions of the pitch are caused to force their way outward through the hotter, less dense portions of the pitch, into engagement with the heated vessel wall.

7. The method of heating to fluidity, solid pitch having a melting point in the neighborhood of 210° F., which comprises centrifugally maintaining a mass of pitch in the form of a hollow cylinder, adding solid pieces of pitch progressively to the hollow cylindrical mass, applying heat to the said hollow cylindrical mass through the periphery thereof, and progressively withdrawing fluid pitch from said hollow cylindrical mass at a temperature in the neighborhood of 400° F.

8. The method of heating to fluidity a material having a highly viscous fluid phase at certain temperatures, which comprises rotating a hollow cylindrical body of such material in rubbing contact with a confining wall, supplying heat at a temperature above the maximum temperature of said highly viscous phase, to heat the rotating body of material through the confining wall, and supplying material to be heated to said rotating body, at a rate depending upon the resistance of the material body to rotation.

9. Apparatus for heating to free fluidity a material having a highly viscous fluid phase at certain temperatures, comprising, in combination, a substantially horizontally disposed heating tube, means for externally heating the tube, a rotary impeller in the tube disposed co-axially with respect thereto for rotating a mass of the material in the tube at sufficient velocity to cause the material to assume substantially the form of a hollow cylinder, means at the introductory end of the tube for confining the rotating material and having an opening through which material can be introduced, means at the discharge end of the tube for confining the rotating material, and means at said discharge end for skimming fluid material from the inner portion of the rotating mass and discharging it from the tube.

10. Apparatus for heating to free fluidity a material having a highly viscous fluid phase at certain temperatures, comprising, in combination, a substantially horizontally disposed heating tube, means for externally heating the tube, a rotary impeller in the tube disposed coaxially with respect thereto for rotating the material in the tube at sufficient velocity to cause the material to assume substantially the form of a hollow cylinder in contact with the tube, and load responsive means for driving the impeller at a rate affected by the resistance of the material adjacent the tube wall.

11. Apparatus as set forth in claim 10, including means for feeding material into the tube at one end thereof, and means responsive to the driving load of the impeller for reducing the feed when the driving load exceeds a predetermined value.

12. Apparatus for heating to free fluidity a material having a highly viscous fluid phase at certain temperatures, comprising, in combination, a heating tube, means for supplying heat externally to the tube, a rotary impeller in the tube for rotating the material in rubbing contact with the tube at sufficiently high velocity to cause the material to assume substantially the form of a hollow cylinder, means for feeding material into the tube, and means controlled by the resistance of the material to rotation for controlling the supply of the material and thereby affecting the temperature of the material in contact with the tube.

13. Apparatus for heating to free fluidity a material having a highly viscous fluid phase at certain temperatures, comprising, in combination, a heating tube, means for supplying heat externally to the tube, a rotary impeller in the tube for rotating the material in rubbing contact with the tube at sufficiently high velocity to cause the material to assume substantially the form of a hollow cylinder, means for feeding material into the tube, and means for maintaining the rate of material supply, and the rate at which the material body is rotated, in such balanced and interdependent relation that the resistance of the material to rotation is held within predetermined operative limits.

14. The method of heating to fluidity a solid material having a highly viscous fluid phase at certain temperatures, which comprises rotating a mass of such material within a tubular heating surface, at such velocity to cause the material to assume the form of a hollow cylinder in contact with the interior tubular heating surface, applying heat to the exterior of said tubular heating surface to raise the temperature of the mass of rotating material to the point of required fluidity, supplying solid material at one end of said rotating mass, removing fluid material from the other end of said mass, and maintaining the speed of rotation of said mass of material sufficiently high to cause any solid material present to be pressed by centrifugal force against said heated surface.

BERT HARRISON McQUEER.